United States Patent [19]

Strommer et al.

[11] 3,997,673

[45] Dec. 14, 1976

[54] METHOD FOR PREPARING BREADING

[75] Inventors: Palmer K. Strommer, Osseo; Kenneth J. Valentas, Golden Valley, both of Minn.

[73] Assignee: General Mills, Inc., Minneapolis, Minn.

[22] Filed: Oct. 16, 1975

[21] Appl. No.: 623,129

[52] U.S. Cl. .............................. 426/62; 426/296; 426/652

[51] Int. Cl.[2] .......................................... A21D 2/00

[58] Field of Search ............ 426/622, 618, 61, 62, 426/289, 296, 449, 549, 555, 450, 18, 652

[56] References Cited

UNITED STATES PATENTS

| | | | |
|---|---|---|---|
| 3,730,729 | 5/1973 | Strommer | 426/511 |
| 3,754,926 | 8/1973 | Strommer et al. | 426/511 |
| 3,870,806 | 3/1975 | Capossela et al. | 426/128 |

*Primary Examiner*—Raymond N. Jones
*Attorney, Agent, or Firm*—G. O. Enockson; N. P. Friederichs

[57] ABSTRACT

A method is provided for preparing a breading material suitable for use in coating various meat and vegetable products. A mixture including flour, yeast, whey together with various other materials is fed into an elongated treating chamber under pressure. The chamber has an inlet at one end and an outlet at the other end. A flow of hot gaseous fluid from the direction of the inlet propels the mixture through the elongated chamber and out of the outlet.

5 Claims, 8 Drawing Figures

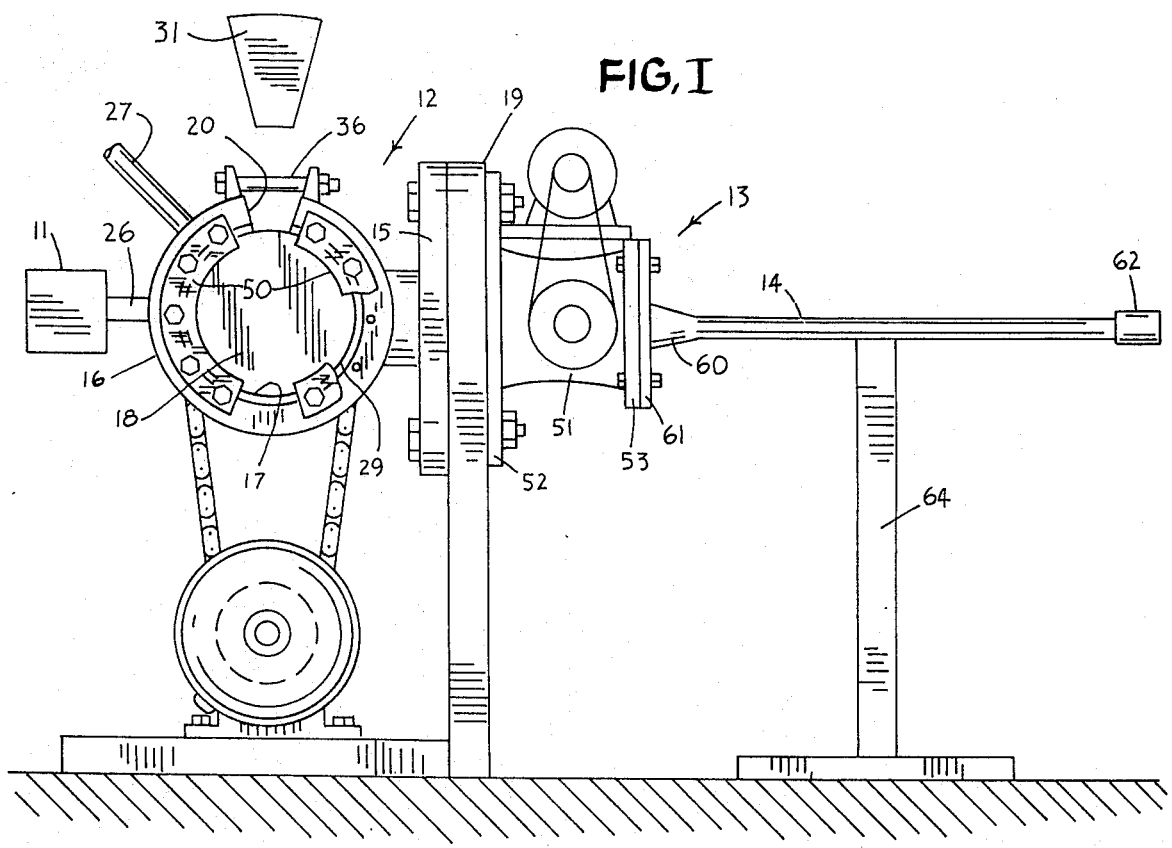
FIG. I
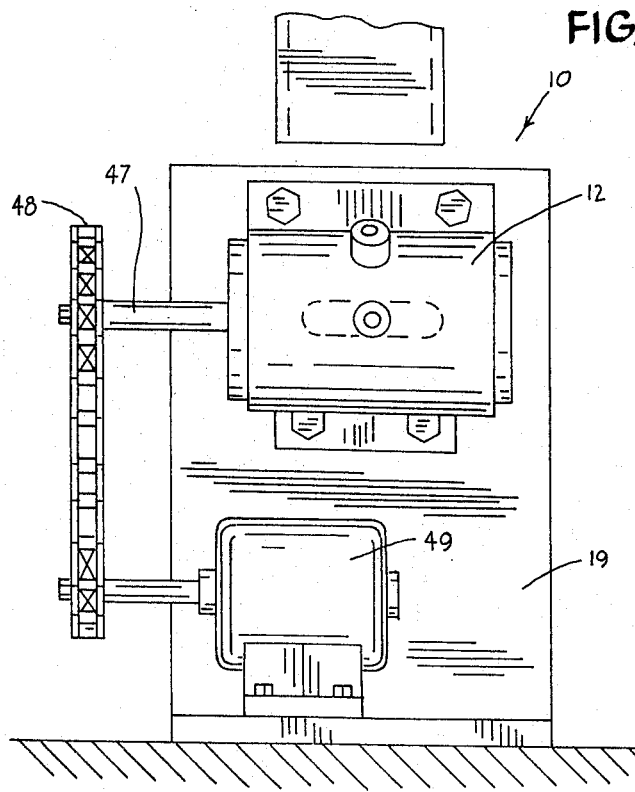
FIG. II
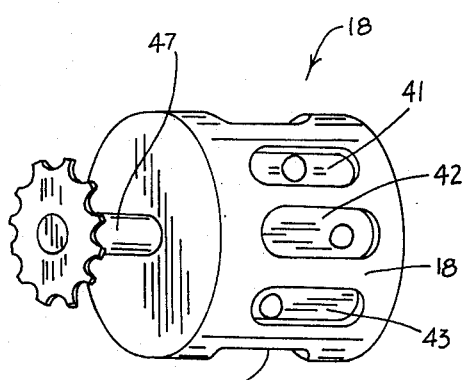
FIG. III

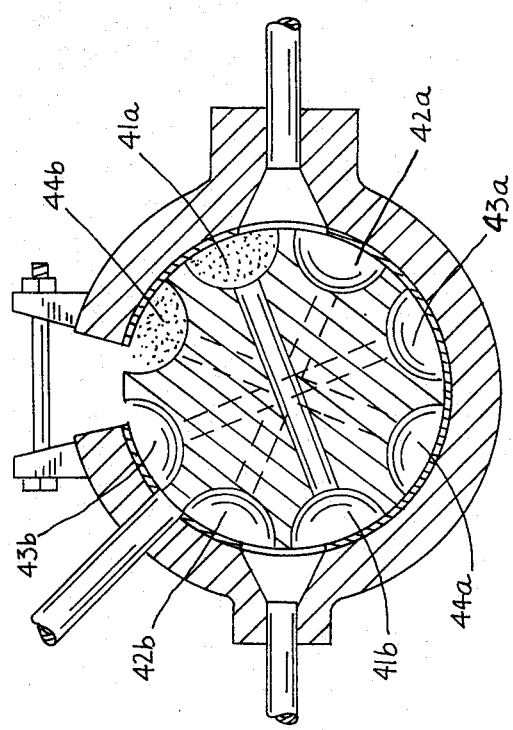
FIG. IV
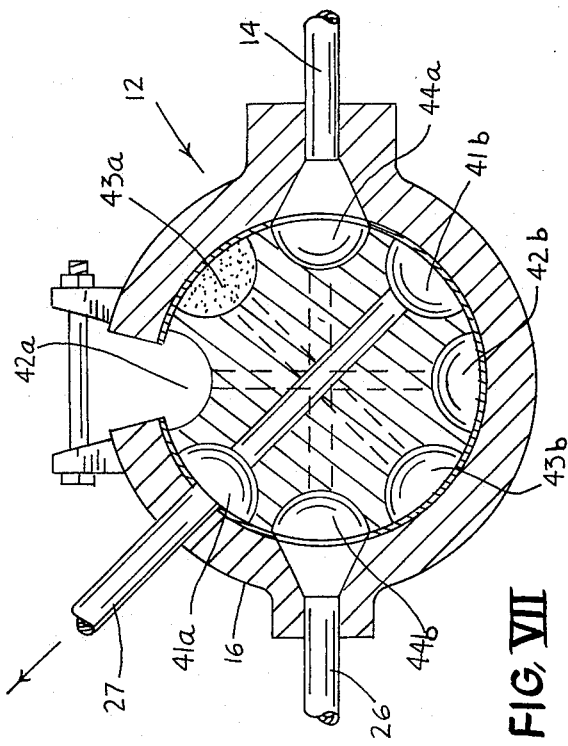
FIG. V
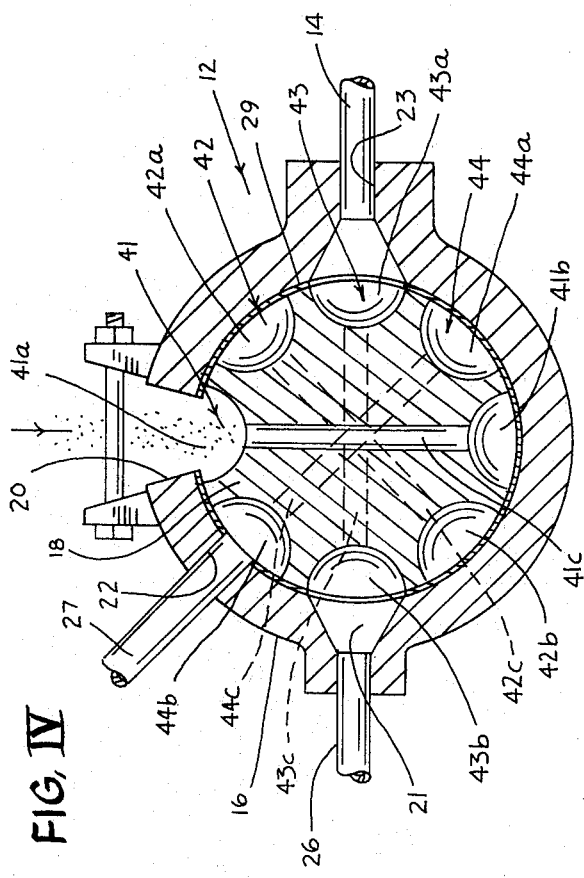
FIG. VI
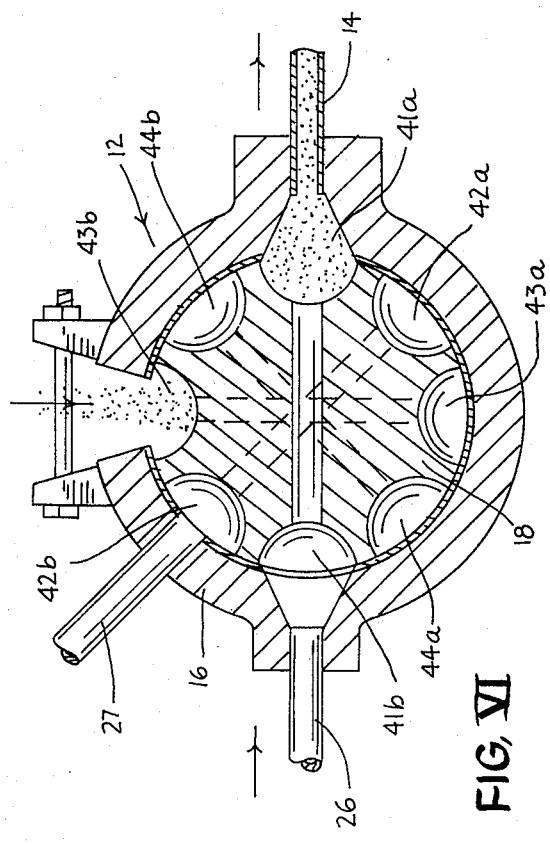
FIG. VII

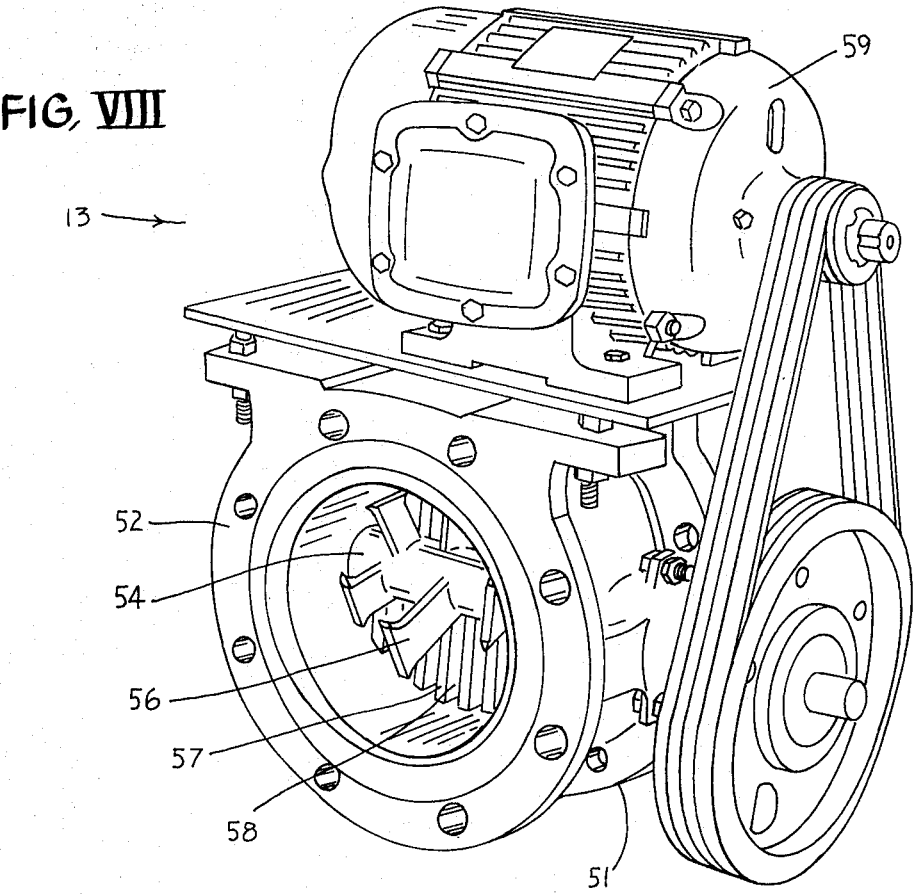
FIG. VIII

METHOD FOR PREPARING BREADING

BACKGROUND OF THE PRESENT INVENTION

The present invention relates to treating of food materials and more particularly to preparation of a breading material.

In recent years a wide variety of food products have been coated with breading material. For example, fish flesh, chicken, steaks and the like are typically coated with such a breading and then deep fat fried or baked. In the past, preparation of a breading material has generally required preparation of a dough, raising of the dough utilizing yeast, baking of the raised dough, dehydration of the baked product, and then crumbling of the baked product. This is sometimes followed by toasting of the crumbled product. Such processing is slow and relatively expensive. In the present invention, a process has been provided which very rapidly produces substantially the same product.

THE PRESENT INVENTION

The present invention provides a method in which a mixture including flour, yeast, whey, salt and the like are treated under elevated temperature and pressure for a short period of time to provide an excellent breading material. The mixture is treated for a short period of time in a gaseous stream, for example at a pressure of at least about 15 p.s.i.g. (pounds per square inch gauge) and may be up to about 140 p.s.i.g. The temperature in the stream may typically be at least about 250° F. and may be up to about 450° F. The stream preferably is steam; however, other gaseous fluids may be used, for example, a mixture of steam and air.

The flour used in the present invention may be wheat flour, oat flour, corn flour, rice flour, soy flour, starch and the like. The flour may be very finely divided or, if desired, may be of a coarser nature such as that typically defined as a meal. The flour may be present in an amount of about 85 to 97%. (The term "percent", "parts" and the like as used herein will refer to parts, percent and the like by dry weight unless otherwise specified.) The autolyzed yeast may be present in an amount of about ½ to 2%. The whey is preferably in a dehydrated form and may be present in an amount of about ½ to 5%. Various other materials may be present, for example, NaCl in an amount of about 2 to 5%; and MSG (monosodium glutamate) in an amount of about ½ to 2%. Various other flavoring materials such as peppercream, onion bits, lemon flavoring, thyme, paprika, ground celery seed and the like may be added. Also if one desires a tougher breading, some vegetable protein may be added. However, the final breading preferably has less than 30% protein present. Apparatus suitable for use in the present process is shown in FIGS. I–VIII.

IN THE DRAWINGS

FIG. 1 shows a side view of the apparatus with portions broken away.

FIG. II shows an end view of the apparatus.

FIG. III shows a portion of a valve of the apparatus.

FIGS. IV–VII show cross sectional views of the valve in various positions of operation.

FIG. VIII shows a perspective view of one type of cutter that may be used in the apparatus.

Apparatus 10 (FIG. I) may include a rotary valve 12, a cutter 13, and a pipe or tube 14. The apparatus 10 is connected to a high pressure fluid source 11, such as a steam boiler, which is capable of providing a fluid or steam pressure to the rotary valve 12 sufficient to process the present mixture.

The rotary valve 12 includes a valve housing 16 with an opening or chamber 17 for reception of the rotary valve member or plug 18. The valve housing 16 has a base 15 for support of the valve 12 on bracket 19. The valve housing 16 has an upper opening 20 which serves as an inlet through which the mixture may enter to be processed. The housing 16 (FIG. IV) further includes openings 21 and 22 for reception of pipes 26, 27 respectively. The pipes, for example, may be threadedly engaged in said openings. The pipe 26 is connected to the steam source 11 and feeds the pressurized steam to the valve 12. Pipe 27 is an exhaust pipe which depressurizes any residual steam pressure in valve 12 prior to the feeding of the mixture to the valve 12 through opening 20. Opening 23 is the outlet through which the processed mixture leaves valve 12. A hopper 31 (FIG. I) may be provided for feeding the mixture to opening 20 in valve 12.

The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 29 tightly against the rotary valve member 18, thereby providing a steam seal between the bearing 29 and the rotary valve member 18. The bearing 29 may be constructed from a brass cylinder. The rotary valve member 18 (FIGS. III–VII) may be of steel and may be constructed from a solid cylinder, or alternatively, may be formed by casting. The member 18 is provided with any desired number of sets of material feeding or conveying chambers such as 41, 42, 43 and 44. The member 18 will typically have 4, 5 or 6 of such sets. Each set includes a pair of pockets such as 41a and 41b, as well as, an interconnecting passageway such as 41c. Set 42 includes pockets 42a, 42b, and passageway 42c. Set 43 includes pockets 43a, 43b, and passageway 43c. Set 44 includes pockets 44a, 44b, and passageway 44c. The rotary valve member 18 has a shaft 47 and a sprocket 48 for driven engagement with suitable power means such as motor 49 (FIG. II). The valve member 18 may be held in position in housing 16 by restraining plates (FIG. I) such as plate 50 which is secured to housing 16 by screws. The rotary valve member alternatively may be as disclosed in U.S. Pat. No. 3,754,926.

The cutter 13 has a housing 51 (FIGS. I and VIII) which may be formed by casting. The housing 51 has a pair of flanges 52 and 53, one being located at either end of the housing 51. The cutter 13 may include a rotatable shaft 54 which carries a plurality of cutting blades 56. The cutter 13 may have a cutting plate 57 with a plurality of slots 58 therein through which the cutting blades 58 may travel. The cutter 13 may be suitably driven such as by an electric motor 59 with drive belt and pulleys. The cutter 13 may be mounted on the bracket 19 by bolting of flange 52 to bracket 19. One type of cutter that has been found satisfactory is the Delumper DSC Multi-Action Processor (produced by Franklin Miller, Inc. of East Orange, New Jersey). Another type of cutter that may be used is the Commitrol Cutter produced by Urshel.

The tube 14 (FIG. I) may be a steel pipe, for example, having a 1½ inch internal diameter. The tube 14 may include a first portion which exits valve 12, feeding into cutter 13, and a second portion which includes a funnel-shaped portion 60 and a flange 61 at one end and a nozzle 62 at the other end. The flange 61 may be secured to flange 53 of cutter 13 such as by bolts. The tube 14 may be further supported by a bracket 64. The nozzle 62 may simply provide a restrictive orifice.

For example, the tube 14 may have an internal diameter of 2 inches and the nozzle 62 may have a fixed internal diameter of ½ inch. Alternatively, the tube 14 may be provided with a variable nozzle. Such a variable nozzle is disclosed and claimed in U.S. Pat. No. 3,707,380. The mixture of the present invention may be added to the apparatus 10 such as through the hopper 31. The feed material leaving hopper 31 falls through opening 20 in housing 16 of valve 12, being deposited, for example, in pocket 41a as shown in FIG. IV. The valve member 18 may rotate in a clockwise direction such that pocket 41a moves into alignment with pipe 14 and pocket 41b moves into alignment with pipe 26 as in FIG. V. At that point the residual pressure in pipe 14 and the pressure from pipe 26 act on the material. The pressure exerted on the material in valve 12 and pipe 14 is sufficient to provide fusion of the material. The pressure exerted through pipe 26 by the fluid source 11 should be enough greater than the back pressure exerted by the pipe 14 that the protein material is rapidly forced through tube or chamber 14 including cutter 13 and out of nozzle 62. As the fused material passes through cutter 13, the material is properly sized for use as a breading material.

EXAMPLE I

A mixture was prepared including 500 parts wheat flour (Dough Builder™), 20 parts table salt, 5 parts peppercream, 3.75 parts MSG, and 5 parts dehydrated whey (as is moisture basis). The materials were uniformly blended and then fed to apparatus substantially as disclosed in FIG. I at a rate of 10 pounds per minute. The steam fed to the apparatus was at a temperature of 440° F. A satisfactory breading material was prepared.

EXAMPLE II

Example I was repeated; however, the mixture in this instance included 500 parts wheat flour, 20 parts table salt, 5 parts peppercream, 3.75 parts MSG, 3.75 parts light autolyzed yeast, and 5 parts whey.

EXAMPLE III

A breading was prepared according to the present invention substantially as described in Example I; however, the mixture included 100 parts Dough Builder™ wheat flour, 3.5 parts table salt, 0.75 parts black soluble pepper, 0.75 parts MSG, 0.10 parts onion bits, 0.75 parts light autolyzed yeast, 0.75 parts paprika powder, 3.0 parts whey and a trace of lemon flavoring as well as a trace of thyme. An excellent breading was prepared particularly suitable for use in seafood breading.

EXAMPLE IV

A breading was prepared by mixing 100 parts rice flour, 100 parts soy flour, 1.5 parts autolyzed yeast, 1 part sugar and 1 part salt. A satisfactory breading material was prepared.

EXAMPLE V

Three breading samples were prepared according to the present invention. The mixtures were as follows:

| Ingredients | A | B | C |
|---|---|---|---|
| Rice Flour | 75 parts | 50 parts | 25 parts |
| Wheat Flour | 25 parts | 50 parts | 75 parts |
| Salt | 2 parts | 2 parts | 2 parts |
| Peppercream | 1 parts | 1 parts | 1 parts |
| Whey | 2 parts | 2 parts | 2 parts |
| MSG | .5 parts | .5 parts | .5 parts |

The embodiments of the invention in which an exclusive property or privilege is claimed are defined as follows:

1. A method for preparing a breading material comprising mixing flour, yeast, table salt, dehydrated whey, and flavoring, said mixture including about 85–97% flour, 0.5–2% yeast, and 0.5–5% whey, by dry weight, feeding said mixture to a confined elongated treating zone, said zone having a gaseous fluid pressure of at least 15 p.s.i.g. and a temperature of at least 250° F. and simultaneously subjecting said mixture to a gaseous flow of sufficient magnitude to propel the material through said pressurized treating zone thereby producing a material in suitable form for use as a breading.

2. The method of claim 1 wherein cutting means are provided in said confined elongated treating zone.

3. The method of claim 1 wherein said mixture further includes about 2 to 5 percent sodium chloride.

4. The method of claim 3 wherein said mixture further includes about 0.5 to 2 percent monosodium glutamate.

5. The method of claim 4 wherein said mixture includes vegetable protein in an amount of up to 30 percent.

* * * * *